(12) United States Patent
Walker (10) Patent No.: US 7,052,067 B2
(45) Date of Patent: May 30, 2006

(54) COMBINATION BED-LINER AND TOOLBOX FOR PICK-UP TRUCK

(75) Inventor: Eric L. Walker, Tremont, IL (US)

(73) Assignee: Precision Metal Kraft, Tremont, IL (US)

( * ) Notice: Subject to any disclaimer, the term of this patent is extended or adjusted under 35 U.S.C. 154(b) by 0 days.

(21) Appl. No.: 10/959,232

(22) Filed: Oct. 6, 2004

(65) Prior Publication Data

US 2005/0146151 A1 Jul. 7, 2005

Related U.S. Application Data

(60) Provisional application No. 60/508,684, filed on Oct. 6, 2003.

(51) Int. Cl.
*B60N 3/12* (2006.01)

(52) U.S. Cl. .................................. 296/37.6; 296/100.02

(58) Field of Classification Search ................ 296/37.6, 296/100.02

See application file for complete search history.

(56) References Cited

U.S. PATENT DOCUMENTS

| | | | |
|---|---|---|---|
| 1,844,727 A | | 2/1932 | Van Vorst |
| 2,347,270 A | * | 4/1944 | Larsson ...................... 312/244 |
| 3,245,713 A | * | 4/1966 | Ogilvie ...................... 296/37.6 |
| 3,326,595 A | * | 6/1967 | Ogilvie ...................... 296/37.6 |
| 3,612,635 A | * | 10/1971 | Uyeda et al. .......... 206/315.11 |
| 4,456,272 A | * | 6/1984 | Kroeger ...................... 280/19.1 |
| 4,548,337 A | * | 10/1985 | Morris ......................... 222/96 |
| 4,705,317 A | | 11/1987 | Henri |
| 4,717,020 A | * | 1/1988 | Viira ........................... 206/372 |
| 4,728,017 A | * | 3/1988 | Mullican .................... 296/37.6 |
| 4,789,195 A | | 12/1988 | Fletcher |
| 4,878,706 A | * | 11/1989 | Novikov .................... 296/37.6 |
| 5,316,358 A | * | 5/1994 | Payne et al. ............... 296/37.6 |
| D352,697 S | * | 11/1994 | Johnson .................. D12/414.1 |
| D366,448 S | * | 1/1996 | Ney et al. ............... D12/414.1 |
| D373,988 S | * | 9/1996 | Johnson .................. D12/414.1 |
| D374,423 S | * | 10/1996 | Downey et al. ........... D12/423 |
| 5,593,201 A | | 1/1997 | Bateman |
| 5,667,268 A | * | 9/1997 | Bump ........................ 296/37.6 |
| 5,845,952 A | | 12/1998 | Albertini et al. |
| 5,964,492 A | * | 10/1999 | Lyon ......................... 296/37.6 |
| 6,102,474 A | * | 8/2000 | Daley ........................ 296/37.6 |
| 6,176,540 B1 | * | 1/2001 | Whittaker .............. 296/100.02 |
| 6,568,739 B1 | * | 5/2003 | Burch .................... 296/100.06 |
| 6,837,383 B1 | * | 1/2005 | McElhaney, Jr. ............ 206/373 |
| 2002/0014506 A1 | * | 2/2002 | Teich ......................... 224/441 |
| 2005/0051980 A1 | * | 3/2005 | Melvin ....................... 280/32.6 |
| 2005/0145527 A1 | * | 7/2005 | Christensen ................ 206/500 |

OTHER PUBLICATIONS

Website Http://www.phenixent.com/Loadngo.asp.

* cited by examiner

*Primary Examiner*—Kiran B. Patel
(74) *Attorney, Agent, or Firm*—Husch & Eppenberger, LLC (57) ABSTRACT

The present invention provides a new and improved method of accessing work tools by users who choose to use the pickup truck as the means of transportation and containment of the work tools they use on a regular basis. The present invention also incorporates a protective lining for the bed of the pickup truck. The protective lining in the bed of the pick-up doubles the system's utility. The protective liner allows the bed of the pickup truck to be used for carrying additional cargo.

14 Claims, 5 Drawing Sheets

Fig. 1
Side View

COMBINATION BED-LINER AND TOOLBOX FOR PICK-UP TRUCK

CROSS-REFERENCE TO RELATED APPLICATIONS

This application claims the benefit of PPA Ser. No. 60/508,684, filed Oct. 6, 2003 by the present inventor. This application also claims the benefit of Design Patent filed Oct. 6, 2004 by the present inventor.

FEDERALLY SPONSORED RESEARCH

N/A

BACKGROUND OF THE INVENTION

1. Field of the Invention

This invention relates to pick-up track accessories, specifically to such accessories which are used for the purpose of mobile storage of tools and/or other items.

2. Background of the Invention

Pick-up truck -up-fitters and outfitters and home improvement stores commonly provide consumers with toolboxes which can be mounted into the bed and/or on the railing of a pick-up truck. These toolboxes generally are used to store tools and/or other good enabling the user to perform his/her job function. That job function may fall into the categories of Trades People, Service, Mill Wrights, Heavy Machinery, Mechanical Maintenance and/or Repair, Hunter, Hobby Enthusiasts or other category in which the user has a need for mobile storage and easy access to those stored objects. These mobile storage units may generically be referred to as utility bodies and/or other high-mount toolboxes.

(a) These traditional storage units open outward and toward the user. Anywhere from four (4) to five (5) inches of useable space is lost. This limits the user to only being able to store smaller hand tools. The storage device limits the size of items placed in the storage devise to an item considerably smaller than the storage device. Mounting excessively large, expensive toolboxes is required to meed the needs of the user. Because of the limited space and lost upper storage space due to the outward opening door, a user needing to carry larger hand tools (such as a large circular saw or grinder or hand drill or tool chest) were required to store such items outside of their toolboxes and exposed to weather causing corrosion and damaging these larger hand tools.

(b) Traditional high mount toolboxes open outward. The outward opening infringes upon the user's ability to easily his/her tools. The user was forced to reach up and over the door causing strain to the user's back. The user must pull his/her tools out onto the door ledge for easier work accessibility. Then, during the job clean-up phase, the user is required to take an additional clean-up step to place tools back into the storage unit; thus, the user loses valuable work time.

(c) The square shape of such current storage units restrict the user's rear-view driving visibility causing potential traffic accidents. The slide-in cargo enclosures further restricts the driver's rear-view visibility.

(d) Water, especially during a hard thunder storm, will seep through hinges in prior art. Tools can be damaged from corrosion.

(e) Other storage units use a cam-action-slam latch or a simple deadbolt which enables dishonest passer-bys to violate the door opening and steal valuable tools inside. The cam-action locks can easily be popped out of their latch pin. The deadbolts can be popped out of their home, locked position.

(f) Originally storage utility bodies were directly mounted onto the frame of the vehicle. This caused holes to be drilled directly into the vehicle, structurally altering the vehicle, and making change-outs unsightly. U.S. Pat. No. 5,845,952 to Albertini (1997) discloses a slide-in storage body which can be placed into the bed of the pick-up without damage to the pick-up; however, this storage unit is one piece. Albertini's invention can not be reconfigured post manufacture.

(g) Bed-liners lose large amounts of usable storage space by failing to capitalize on the space between the rear wheel-wells and potential for utilizing this space not only for storage, but also for stake pockets to double deck the main part of the pick-up bed.

OBJECTS AND ADVANTAGES

My own patent "Combination Bed-Linear and Toolbox for Pick-up Truck" (2004) revolutionizes how users view high-mount toolboxes. Beyond the obvious advantages of traditional toolbox storage, and advantages of the present invention include:

(a) to create hinged doors on the toolbox sections which open upward to a minimum height of twenty-two inches above the base of the compartment;

(b) to provide an ergonomically correct access; to utilize gas springs hold the doors up out of the way, so both hands can be used to remove or to insert work tools in the compartments so as to create a built-in work station.

(c) to allow greater visibility to the rear of the vehicle than previously conceived toolboxes, thus reducing blind spots to the rear of the pickup truck and improving safety and visibility;

(d) to provide the consumer with a weather resistant hinge;

(e) to utilize a reverse deadbolt; thereby, forbidding theft;

(f) to allow the user to mix-and-match brands of top storage unit attached to the bottom storage unit or bed-liner and to provide the user flexibility to mount the storage units directly to the side-rails of the pick-up or to the bed-linear; thereby, providing the consumer with an option to utilize the toolbox storage compartments separately from the bed-liner;

(g) to maximize and utilize the storage space above the rear wheel wells.

(h) to maximize and utilize the storage space behind the rear wheel wells.

Further objects and advantages of my invention will become apparent from a consideration of the drawings and ensuing description.

SUMMARY OF THE INVENTION

The present invention is comprised of three sections of storage compartments. The first section of the toolbox system contains a set of compartments for holding a multitude of work tools. There are two separate sections, one on each side of the pickup truck. These sections can be customized with drawers and dividers in order to allow for multiple configurations that hold work tools securely in place. In addition, a reverse deadbolt locking system is utilized in order to insure the doors remain in the closed position until the user wishes to open the compartment and to protect against theft.

The present invention provides rear visibility unachieved by other inventions. Due to all of the compartments being compact and on the sides of the pickup truck bed, the rear window of the pickup track has minimal obstructions. The trapezoidal shape of the toolbox promotes and allows greater visibility to the rear of the vehicle than previously conceived toolboxes, thus reducing blind spots to the rear of the pickup truck and improving safety and visibility.

The entire structural integrity of this toolbox system allows it to be supported outside of and/or remotely located from that of the pickup truck. The present invention also has the capability to use truck camper jacks to support toolbox system. The truck camper jacks can be attached and detached, allowing the pickup track to back in and pull out from underneath the toolbox system.

DRAWINGS—REFERENCE NUMBERS

10. Pick-up Truck Assembly
12. Bed Liner Assembly
14. Jack Mount Support Assembly
16. Toolbox Assembly
18. Toolbox Lid Assembly
20. Latch Assembly
22. Water Channel
24. Middle Lid End
26. Lid Plate
28. End Lid End
30. Toolbox Base Latch Rod
32. Lid Latch Rod
34. Actuator
36. Upper Hinge Half, C Profile
38. Lower Hinge Half, P Profile
40. Toolbox Base End
42. Toolbox Base
44. Actuator Mounting Bracket
46. Corner Gusset
48. Bed Liner Top Plate
50. Bed Liner Middle Rail
52. Rear quarter Rail
54. Bed liner Side
56. Large Cutout
58. Small Cutout
60. Jacking Bracket
62. Jacking Bracket Receiver
64. Clamp Assembly

DETAILED DESCRIPTION

FIGS. 1, 2, 3 and FIGS. 4, 5, 6 and FIGS. 7, 8

Preferred Embodiment

Figure 1:
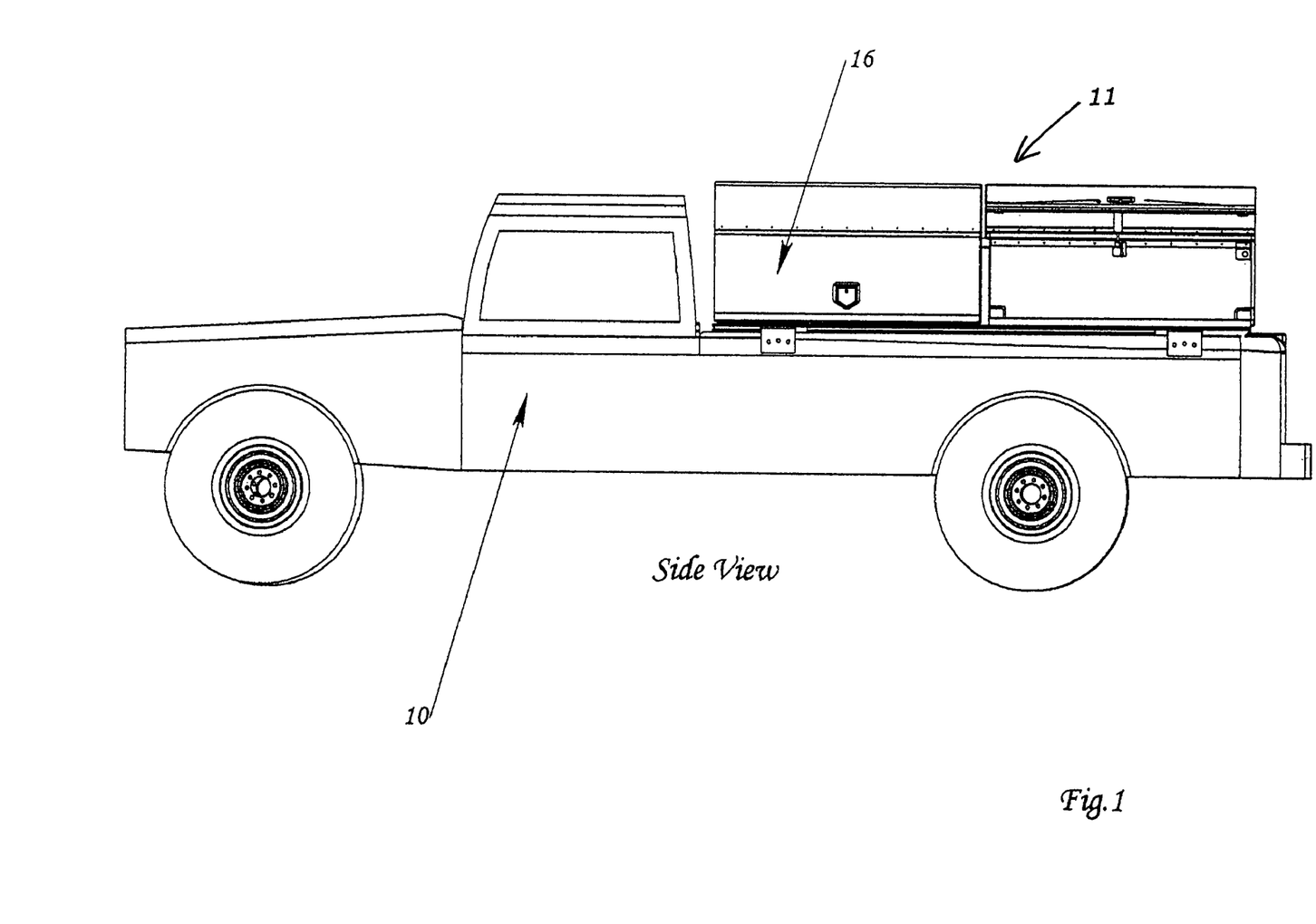
FIG. 1 shows a side view of the combined system with an opened compartment on each section of the toolbox units.
Figure 2:
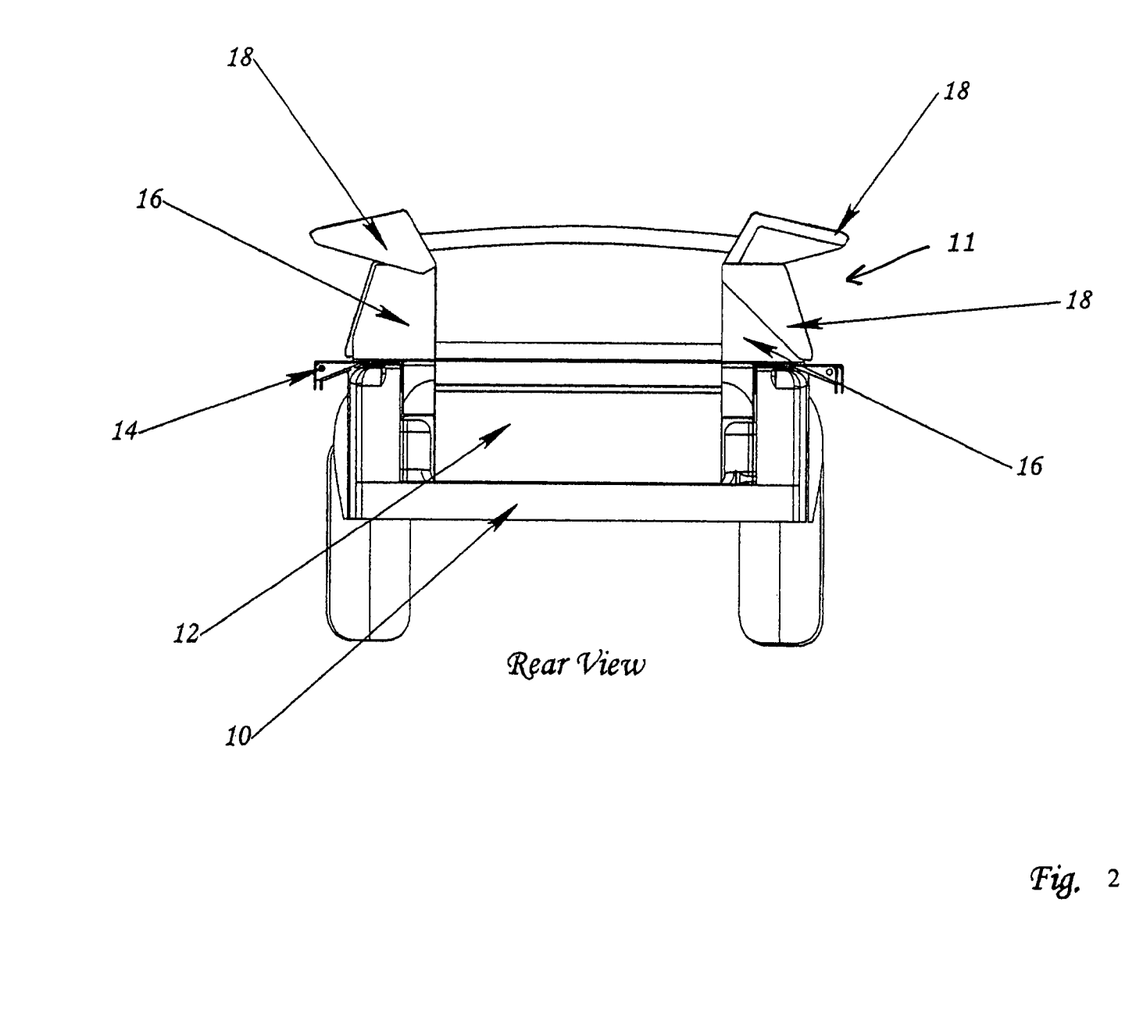
FIG. 2 shows a rear view of the toolbox compartments mounted onto a surface, in this case a pick-up truck.
Figure 3:
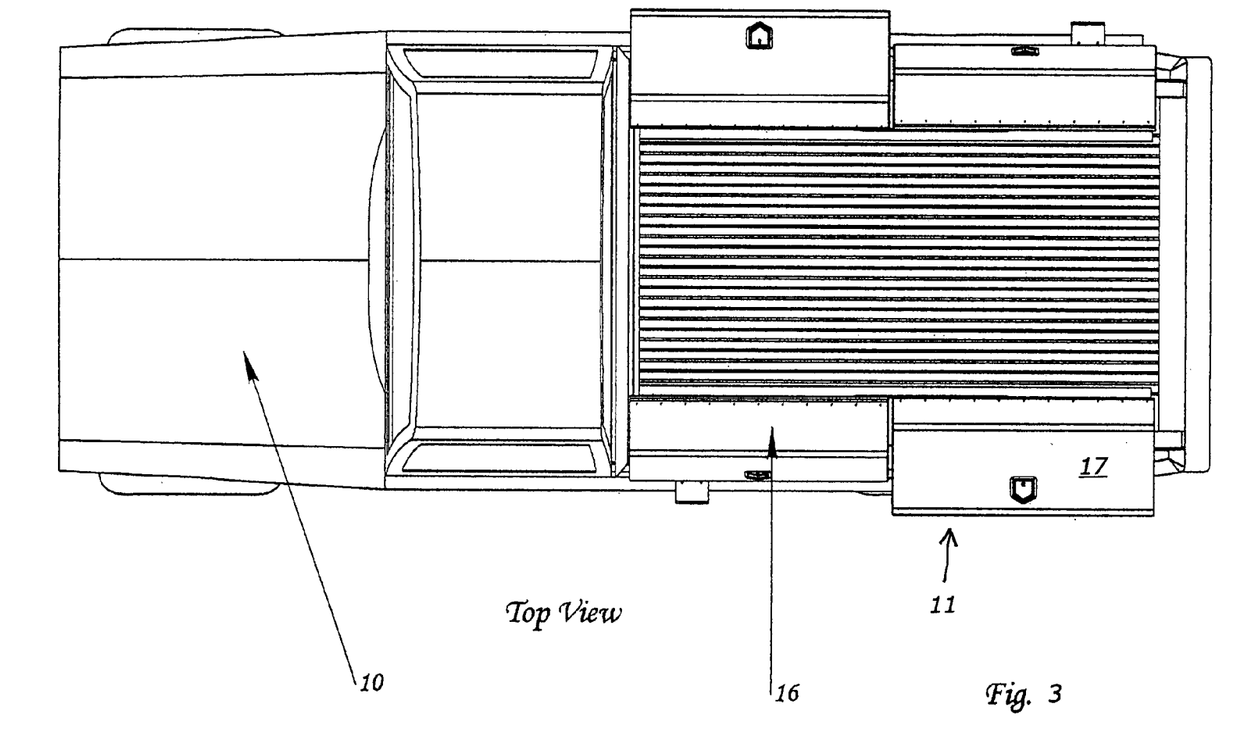
FIG. 3 shows a top view of the bed-liner with toolboxes mounted to the flange of the bed-liner.
Figures 4, 5, 6:
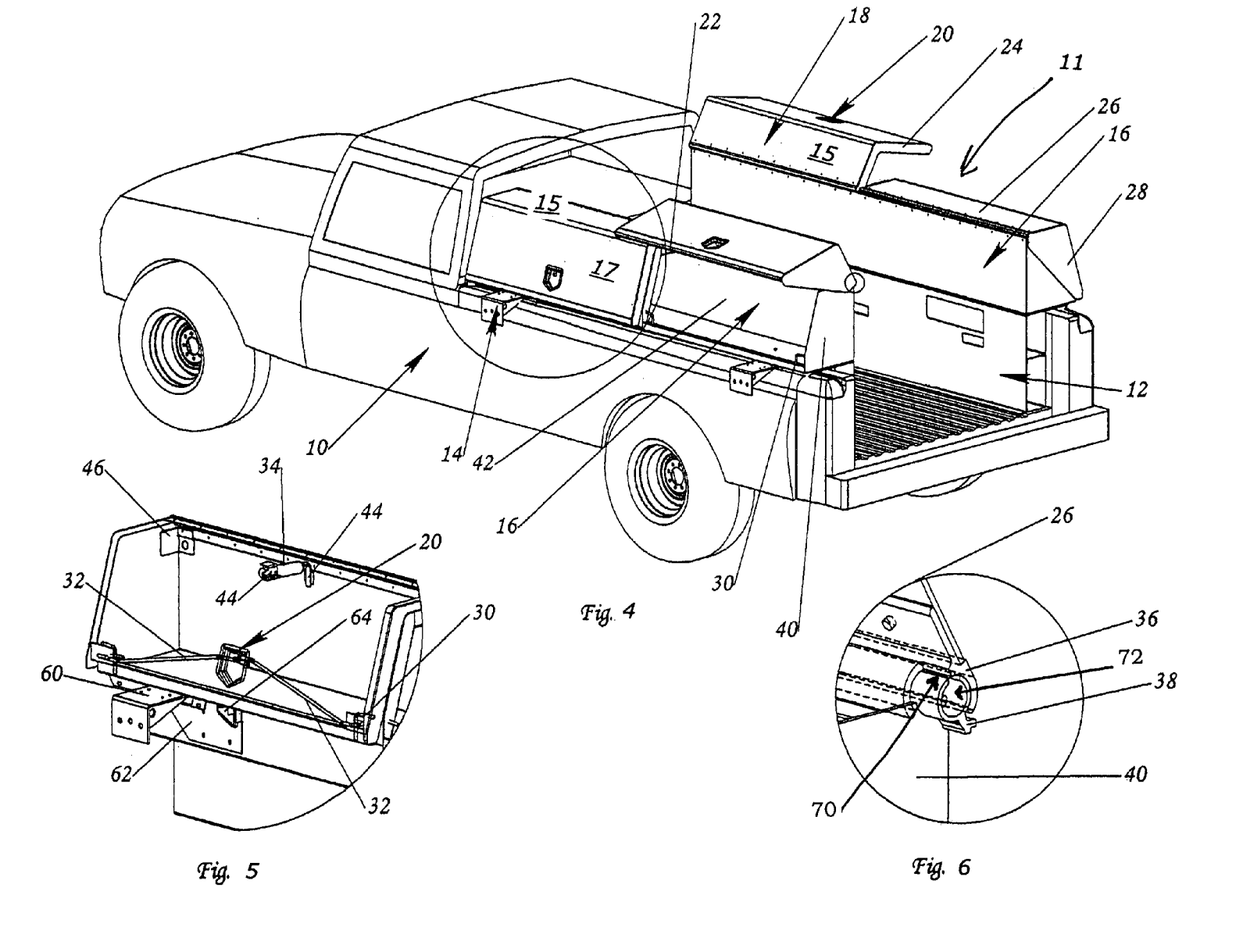
FIG. 4 shows a perspective of the toolbox compartments mounted onto a surface, in this case a pick-up truck.
FIG. 5 shows a detail view of the latching mechanism.
FIG. 6 shows a detail view of the hinge mechanism.
Figures 7, 8:
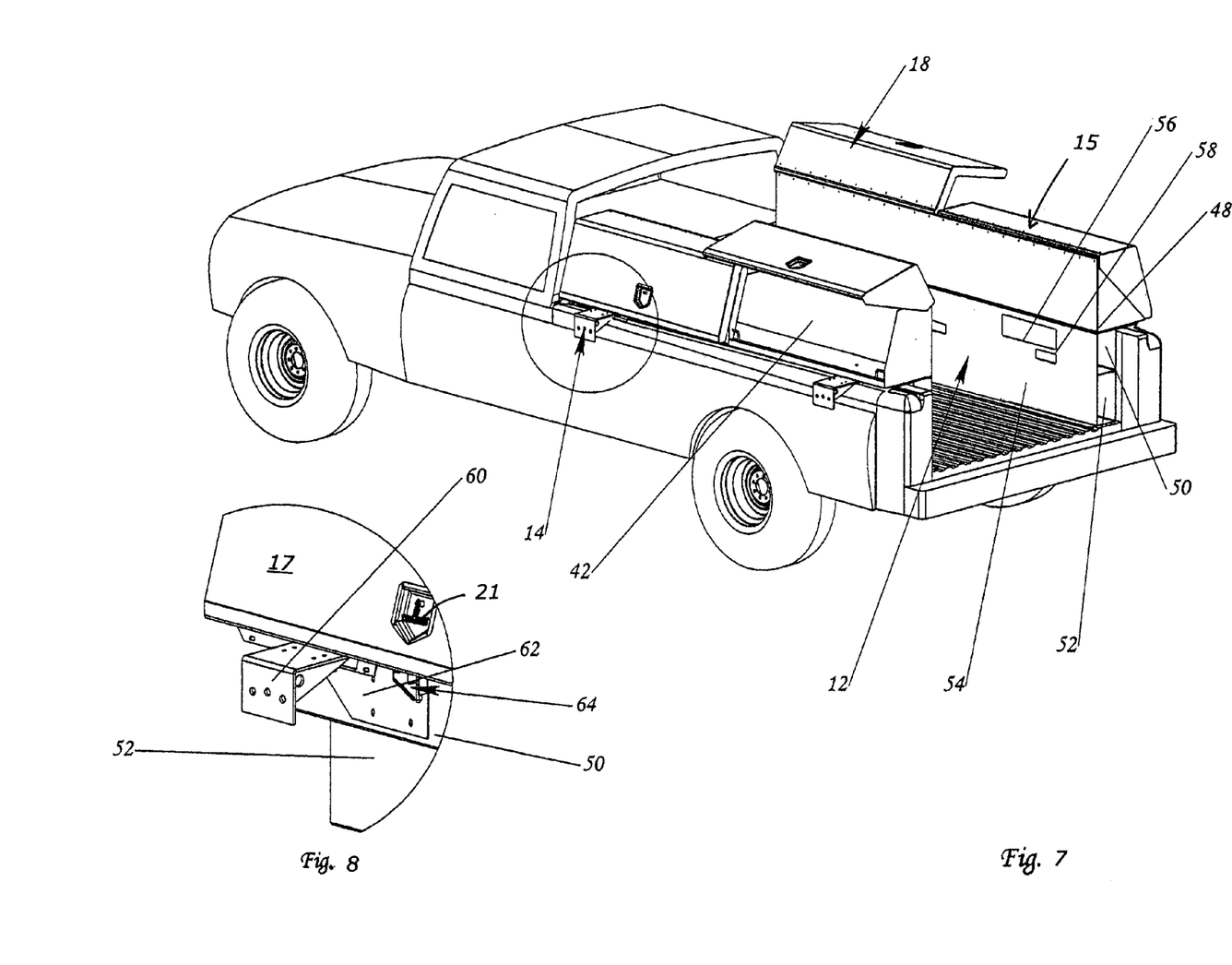
FIG. 7 shows a perspective of the bed liner compartments mounted onto a surface, in this case a pick-up truck.
FIG. 8 shows a detail view of the jack mount mechanism.

A preferred embodiment of a Combination Bed-Liner and Toolbox system (11) for use with a Pick-up Truck is illustrated in FIG. 1A (side view), FIG. 2 (rear view), FIG. 3 (top view) FIG. 4 (perspective view), FIG. 5 (detail view), FIG. 6 (detail view), FIG. 7 (perspective view), and FIG. 8 (detail view). The bed-liner and toolbox 11 includes a toolbox assembly (16) and a bed-liner 12). In the depicted embodiments, the bed-liner and toolbox (11) has two toolbox assemblies (16). The toolbox assembly (16) is attached to the bed-liner (12). As can be seen in FIGS. 2, 4, and 7, the Combination Bed-Liner and Toolbox system (11) may include jack mount support assembly (14). As best seen in FIG. 8, the jack mount support assembly (14) is attached to a bed liner middle rail (50). As can be seen in FIGS. 1 3, 4, and 7, the pick-up truck (10) has a longitudinally extending cargo area, and the toolbox assembly (16) extends in a longitudinal direction to complement the cargo area.

FIG. 1 shows a side view of the Bed Liner and Toolbox (11) as it might appear mounted in a commercial pickup truck (10). FIG. 2 shows a rear view of the bed liner and toolbox (11) as it might appear mounted in a commercial pickup trunk (10). FIG. 3 shows a top view of the bed liner and toolbox (11) as it might appear mounted in a commercial pickup truck (10). FIG. 4 shows a perspective of the bed liner assembly (12) and the toolbox assembly (16) as it might appear mounted in a commercial pickup truck (10). Toolbox assembly (16) includes toolbox base (42), also termed the box section, backbone, main channel, or support (42). The toolbox base (42) is connected to the toolbox base end (40), also termed the end panel or box end, by welding or another appropriate attachment method such as rivets, bolts or other loose hardware or by adhesive, glue or other currently available attaching methods. The toolbox (42) is connected to the water channel (22), also termed the center rib, rain channel, mid rib, or divider by welding or another appropriate attachment method such as rivets, bolts or other loose hardware or by adhesive, glue or other currently available attaching method. The toolbox base has a bottom and a back extending vertically from the bottom.

The lid plate (26), also termed the lid, door panel, top, or wing, is connected to the end lid end (28) also termed the lid end panel and the middle lid end (24), also termed lid end mid, lid mid panel by welding or another appropriate attachment method such as rivets, bolts or other loose hardware or by adhesive, glue or other currently available attaching method.

FIG. 6 shows a detail view of the hinge assembly. The lid assembly (18) is hinged to the tool box base (42) by a two piece hinge (36, 38). The lid assembly (18) is connected to the upper hinge half (36) with loose hardware such as bolts, screws and or rivets. Additionally the joint between the lid assembly (18) and the upper hinge half (36) is weather proofed to resist moisture migration with structural adhesive sealant. The upper hinge half (36) is attached to the lower hinge half (38), by sliding over the P profile (38). The upper hinge half (36) is secured to the lower hinge half (38) to prevent longitudinal movement by the end lid end (28) and the middle lid end (24). Axial movement is maintained between the upper hinge half (36) and the lower hinge halt (38). The lower hinge half (38) is attached to the toolbox base (42) with loose hardware such as bolts, screws and or rivets. Additionally the joint between the lower hinge half (38) and the toolbox base (42) is weather proofed to resist moisture migration with structural adhesive sealant. The lid assembly (18) has a top surface (15) and a front surface (17). The top surface (15) is located opposite the bottom of the base (42) when the lid assembly (18) is in the closed position. The top surface (15) and the front surface (17) form an angle between ninety-five and one hundred fifteen degrees.

FIG. 5 shows a detail view of the latching mechanism. The latch assembly (20) is attached to the lid assembly (18) with loose hardware such as bolts, screws and or rivets. The latch assembly (20) is attached to lid latch rod, also termed the latch rod, dead bolt, slide rod, or hook on the latch assembly (20) end with loose hardware such as a cotter pin, bolt or other fastener. The lid latch rod (32) connects to the base latch rod (30) freely by hooking around, behind or through a void or opening created by the base latch rod (30), the base end (40) and the toolbox base (42). The latching action is accomplished by the rotating a T-handle (21) of the latch assembly (20) thereby rotating a cam connected to the base latch rod (30) and pulling the hooked end of the lid latch rod (32) around and behind the base latch rod (30). FIG. 5 also illustrates an actuator (34) connected to an actuator mounting bracket (44). The actuator mounting bracket (44) is connected to the toolbox base (42). FIG. 5 further illustrates a corner gusset 46 connected to the toolbox base (42).

FIG. 7 shows a perspective view of the combination bed liner and toolbox system (11) as it might appear mounted in a commercial pickup track (10). The bed liner assembly (12) includes a plurality of sub components. The bed liner side (54), also termed sidewall, riser, wall, or side rail extends the length of the pickup bed and rises above the floor approximately equal to the top of the pickup truck bed rail. The bed liner side (54) attaches to the bulkhead at the front of the bed liner with weld or a plurality of loose fasteners such as rivets, screws or bolts. Additionally, the bed liner side (54) attaches to the bed liner middle rail (5), also termed the mid rail, middle channel, running the length of the bed liner (12) with weld or a plurality of loose fasteners such as rivet, screws or bolts. The bed liner side (54) attaches to the rear quarter rail (52) with weld or a plurality of loose fasteners such as rivets, screws or bolts. FIG. 7 also illustrates jacking bracket (60) and a jacking bracket receiver (62). The jacking bracket (60) and the jacking bracket receiver (62) are part of the jack mount support assembly (14). The jack mount support assembly (14) also includes the a clamp 64.

The bed liner side (54) contains a plurality of cutouts, holes, openings (56, 58) into which numerous object or devises can be inserted. The large cut out (56) opens into the longitudinal void created by the rear quarter rail (54) and the middle rail (50). This void extends the length of the pickup truck bed and is rectangular in shape. The small cut out (59) opens into the longitudinal void created by the bed liner side (54) and the middle rail (52). This void extends the length of the pickup truck bed and is rectangular in shape.

Operation—FIGS. 1, 2, 3, 4, 5, 6, 7, 8

The present invention is comprised of three sections of storage compartments.

(a) The first and second sections (16) of the combination bed liner and toolbox system (11) contains a set of compartments for holding a multitude of work tools.

(b) There are two separate sections (16), one on each side of the pick-up truck. These sections can be customized with drawers, dividers, shelves, or some combination thereof.

(c) The third section (12) comprises a support structure and integral storage structure containing a multitude of storage compartments primarily for the storage and transport of a multitude of work tools.

The Combination Bed-Liner and Toolbox for Pick-up Truck (11) system is adapted to reside in the bed of a pickup truck or attached to a trailer in order to allow the bed of the pickup truck to be used for carrying additional cargo.

The first and second sections (16) are essentially trapezoidal, with the angled, nonperpendicular portion of the trapezoid approximating the angle of the pick-up cab sidewall B-post (generally between 95 degrees and 115 degrees). The front and top faces of the section comprise the door opening. The general dimensions of the section are approximately twelve inches at the base and eight inches at the top, and approximately fourteen inches high, but could be taller or shorter based on desires and needs for the compartments. The length of the compartments would be dependent upon the dimensions of the particular pickup truck the toolbox system was installed in or the desires of the retail purchaser. The compartments are comprised of a rigid material such as diamond tread aluminum, but could be various grades of steel, aluminum, stainless steel, or various composite materials such as fiberglass or plastic. The door opens approximately equal to the top of the sidewall and the depth of the box.

The third section (12) of the toolbox and bed liner system (11) is the section that rests on the bed of the pickup truck and extends upward above the wheel wells of the truck bed and continues upward, stopping approximately flush with the top of the side of the truck bed. The sections above both wheel wells utilize space that is wasted with most toolbox systems. These sections can be used for additional storage of long, narrow items. The size of these spaces is approximately five (5) inches wide eight (8) inches tall and ninety-six (96) inches long. Drawers are also available for placement in this section directly behind the pickup truck wheel wells. The drawers open rearward, extending over the tailgate. The second section area behind the wheel wells, also has the capability for a slide-out vise or clamping tool to be attached and stored. This section is comprised of a rigid material such as diamond tread aluminum, but could be various grades of steel, aluminum, stainless steel, or various composite materials such as fiberglass or plastic.

The third section (12) of the system (11) also acts as a protective lining or bed liner. The protective lining for the bed of the pickup slides in and out similarly to the way truck camper body would. The lining is comprised of a rigid material that is able to support the weight of the toolbox system and the work tools being stored there in. The lining of the toolbox system approximates the interior dimensions of the pickup truck bed, maintaining a space approximately four feet wide by eight feet long. This section is comprised of a rigid material such as diamond tread aluminum, but could be various grades of steel, aluminum, stainless steel, or various composite materials.

The first, second, and third sections of the system (11) are fastened together using floating fasteners. This allows the tool compartments to be temporarily removed, if more space is needed for larger items, but still allows the protective liner to remain in place to prevent scratches to the truck bed and sides.

FIG. 5 shows a detail view of a latching mechanism for a toolbox assembly (16) of the present invention. The latch assembly (20) actuates the lid latch rod (32) moving it bi-directionally along the lid assembly. The lid latch rod (32) has a straight flat surface on one end and a hook on the opposing end. The hooked end is oriented approximately perpendicular to the straight flat end. The straight flattened end of the lid latch rod (32) attaches to the latch assembly (20) with a Pin or other loose fastener. The cam on the latch assembly (20) rotates clockwise or counter clockwise causing the lid latch rod (32) to slide in or out toward the ends of the lid. The outward movement of the lid latch rod (32) is a dead bolt action. A dead bolt action is generally accepted as a very secure latching method. The hook on the latch rod allows the dead bolt action to be accomplished in reverse when the latch rod is drawn in toward the center of the box opposite the generally accepted dead bolt action. The reverse deadbolt action draws the hooked end of the latch rod around the toolbox base latch rod (30) securing the lid assembly (18) on the toolbox assembly (16). The base latch rod (30) is secured to the toolbox base (42) through a hole in the toolbox base (42) and by loose fasteners or welding.

FIG. 6 shows detailed view of the hinge assembly for the toolbox assembly (16). The upper hinge half (36) attaches to the lid plate (26) with loose fasteners and adhesive sealant. The lower hinge half (39) attaches to the toolbox base (42) with loose fasteners and adhesive sealant. The upper hinge half (36) is roughly a "C" shape or a crescent shape. The lower hinge half (38) is generally a "P" shape having a circular portion with a leg with the exception that there is an opening (70) in the top of the P where by water is channeled out of the hinge. As can be seen in FIG. 6, the lower hinge half (38) includes an inner passage (72). Relatively tight tolerances on the upper hinge half (36) and the lower hinge half (38) provide a snug fit between the two hinge halves. The snug fit discouraged water migration into the hinge and toolbox. The opening in the P shaed lower hinge half (38) mitigates water migration. The C shaped upper hinge (36) fits around the P shaped lower hinge much like a pipe might slide inside another pipe. A pipe on pipe design provides a secure, wear resistant hinge. The present hinge design allows for ninety plus degrees of movement. The shape of the lower hinge (38) moves the hinge point out-ward so that the opening of the toolbox lid does not protrude beyond the vertical back wall of the tool box. As can be seen in FIG. 6, the upper hinge half (36) and the lower hinge half (38) are concentric.

Shelves might be added to the insides of the toolboxes in various configurations so as to allow the user better organization and, thus, better work efficiency. Hooks and/or other apparatus might also be added in order to better organize and store the user's objects. For example, a hunter might place a gun rack inside the toolboxes.

Various uses in addition to tool storage could be conceived by varying configurations of the system in part or in whole. For example, the bed liner and toolbox assembly could be fitted to a small trailer for use as a tool trailer there by allowing the pickup truck to haul other items and the toolboxes still serve to carry and store tools and other items. Another example might be, the toolbox bodies could be clamped onto a small utility vehicle for use in carrying and storing weapons and/or other munitions for hunting and/or military purposes. For this purpose, the toolbox bodies might be clamped to the vehicle ninety degrees from that shown in FIG. 2 and such that the door openings provided a movable shield for the user.

ADVANTAGES

My invention design that has a door opening with the hinge point that is essentially diagonal to the latch point thereby creating a box with essentially two sides that open allowing door opening dimensions that exceed any single face side dimension. Hinged doors open upward to an approximate height of twenty-two inches or greater above the base of the compartment. This clearance height allows for easy access to all of the work tools being stored.

The high mount toolbox design incorporating a trapezoidal shape with one face that approximates the angle of the cab side wall, but can vary in angle from slightly less than the cab angle to vertical creating a box shape that is essentially trapezoidal but allows for essentially a square or rectangular shape. But, that the trapezoidal shape creates an aesthetically pleasing look.

The shape additionally serves a safety purpose. The present invention provides superior rear visibility. Due to all of the compartments being compact and on the sides of the pickup truck bed, the rear window of the pickup truck has minimal obstructions. The trapezoidal shape of the toolbox promotes and allows greater visibility to the rear of the vehicle than previously conceived toolboxes, thus reducing blind spots to the rear of the pickup track and improving safety and visibility.

The utility box incorporates a weather resistant hinge. The hinge being of a pipe on pipe design that incorporates a method for expelling or channeling water seepage out of the hinge and/or out of the box interior. The hinge design is essentially two pieces of material that interlock by sliding together one over the other. The hinge is attached to the supporting box components in a fashion that allows the hinge to become a structural component adding significant strength and stiffness to the structure and sheet metal parts but is attached in such a fashion that the hinge and/or structural/sheet metal components are easily replaceable or repairable while maintaining resistance to moisture penetration.

The design incorporates common latching and locking hardware and the unique deadbolt system in which the deadbolts operate in reverse of what is thought to be standard deadbolt operation and incorporate to compress the weather stripping and door seal when properly engaged.

The toolboxes can be clamped onto any mobile or stationary surface enabling the unit to serve as a storage device on multiple kinds of vehicles and/or machinery.

A support structure that is essentially the same size and dimensions as the interior of commercially produced pickup truck box with variances allowed for dimensional differences between manufacturers. The support structure, hereafter call bed liner, is designed in such a way that it protects the original bed from damage while improving the efficiency of the usable space in the pickup bed. The bed liner may be constructed of metal, composite material or other suitable material that can support itself in a ridged or near ridged shape.

The bed-liner incorporates stake pockets such that cross members can be inserted horizontally into the stake pockets and when use in conjunction with a piece of plywood or other ridged material create a second level or deck in the bed liner thereby allowing the end user to segregate one kind of material from another or allow the bed liner to be subdivided into two of more compartments for the purpose of controlling cargo movement.

CONCLUSION, RAMIFICATIONS, AND SCOPE

In conclusion, the trapezoidal shape and upward opening doors of my invention provide unsurpassed capacity and ease of access. This ease of access allows the user greater efficiency and organization of tools of other stored pieces in that it permits an unsurpassed upward opening door allowing the user easier access to his/her stored items and to capitalize on all the usable space within the box;

it permits driver visibility;

it prevents water entry corroding expensive stored items;

it prevents theft of expensive stored items;

it permits easy vehicle change-outs and reconfiguration of objects to permit user flexibility and need specific utility;

to permit maximum usage of the pick-up bed and even more advantageous the rear wheel well space.

While my above description contains many specificities, these should not be construed as limitations on the scope of the invention, but rather as an exemplification of one preferred embodiment thereof. Many other variations are possible. Accordingly, the scope of the invention should be determined not by the embodiment(s) illustrated, but by the appended claims and their legal equivalents.

I claim:

1. A toolbox assembly for use with a vehicle having a cargo area and a non-vertical B-post, the toolbox assembly comprising:
   a. a base, said base extending longitudinally along the cargo area;
   b. a first lid assembly pivotably connected to said base, wherein the base has a bottom and a back extending substantially perpendicular to said bottom, and said first lid assembly has a top surface and a front surface, said top surface being located opposite said bottom when said first lid assembly is in a closed position, and said top surface and said front surface forming an angle such that said front surface is substantially parallel with the non-vertical B-post;
   c. a hinge mechanism connecting said first lid assembly to said base, said hinge mechanism comprising a crescent shaped upper hinge portion connected to said first lid assembly and a circular shaped lower hinge portion connected to said base, wherein said lower hinge portion is generally concentric with said upper hinge portion and said upper hinge portion rotates about said lower hinge portion;
   d. a locking mechanism connected to said first lid assembly;
   e. a base latch rod connected to said base;
   f. a lid latch rod having a hooked end portion, said lid latch rod connected to said locking mechanism such that said hooked end portion is pulled in a substantially medial direction to positively engage said base latch rod upon operation of said locking mechanism;
   g. a second lid assembly pivotably connected to said base; said second lid assembly longitudinally spaced apart from said first lid assembly;
   h. a second latching mechanism connected to said second lid assembly;
   i. a second hinge connecting said second lid assembly to said base, said second hinge comprising a crescent shaped upper hinge portion and a circular shaped lower hinge portion; and
   j. a water channel located intermediate said first lid assembly and said second lid assembly.

2. The toolbox assembly according to claim 1, wherein said first lid assembly does not protrude beyond said back of said base when said first lid assembly is in an open portion.

3. The toolbox assembly according to claim 1, wherein said angle is between about ninety-five and about one hundred-fifteen degrees.

4. The toolbox assembly according to claim 1, wherein said lower hinge portion includes an inner passage.

5. The toolbox assembly according to claim 1, wherein said lower hinge portion further comprises an opening to channel water out of said hinge.

6. The toolbox assembly according to claim 1, further comprising an actuator mounting bracket mounted to said base and an actuator mounted to said actuator mounting bracket.

7. The toolbox assembly according to claim 1, wherein said locking mechanism further comprises a T-handle, said T-handle adapted to operate said locking mechanism for movement of said lid latch rod.

8. The toolbox assembly according to claim 1, wherein said base further comprises a base end and a corner gusset.

9. The toolbox assembly according to claim 1, wherein said first lid assembly further comprises a lid plate, a lid middle end connected to said lid plate, and an end lid end connected to said lid plate.

10. The toolbox assembly according to claim 1, further comprising a bed liner connected to said base.

11. The toolbox assembly of claim 10, further comprising a second toolbox assembly connected to said bed liner.

12. The toolbox assembly of claim 10, wherein said bed liner further comprises a bed liner side, a bed liner middle rail, and a rear quarter rail.

13. The toolbox assembly according to claim 12, further comprising at least one cutout in said bed liner side.

14. The toolbox assembly according to claim 12, further comprising a jacking bracket connected to said bed liner middle rail.

* * * * *